Patented May 9, 1944

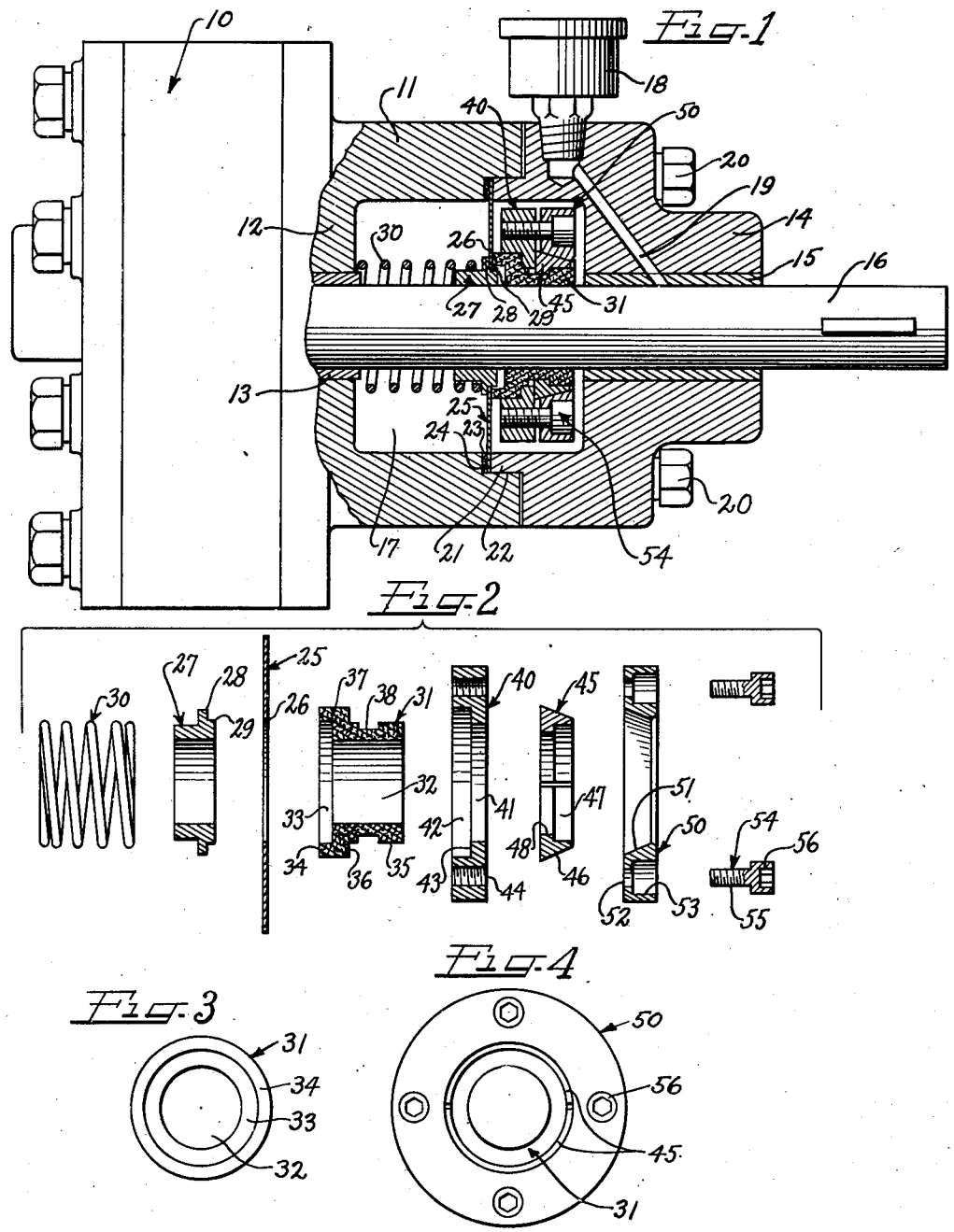

2,348,405

UNITED STATES PATENT OFFICE 2,348,405

SEAL CONSTRUCTION

Oscar G. Odelius, Chicago, Ill.

Application February 22, 1943, Serial No. 476,684

8 Claims. (Cl. 286—11)

This invention relates to seal constructions generally adaptable for preventing leakage between two relatively movable parts.

Specifically, the invention relates to shaft seals including a spring metal diaphragm loosely embracing a shaft, a hard wearable non-swelling plastic composition bushing having an end face for sliding sealing contact with a face of the diaphragm, and a clamping assembly for compressing the bushing onto the shaft.

While the seal constructions of this invention are universally useful for sealing relatively movable members, they will be specifically hereinafter described as embodied in a seal construction for a pump shaft. It is to be understood, however, that this embodiment of the invention is only an example of one of the many uses of the invention, and that the invention is not limited to such usage.

According to this invention a pump casing and an end cap cooperate to define a chamber and bearing supports for a shaft passing through this chamber. A flexible diaphragm preferably composed of a thin disk of spring steel is clamped around the periphery thereof between the pump casing and the end cap. This diaphragm extends into the chamber and has a central aperture therethrough freely receiving the shaft. A hard wear-resisting bushing composed of plastic, compressed fiber composition or the like material capable of being radially deformed is clamped onto the shaft by means of a split ferrule clamping device and has an end face for sliding face to face engagement with one face of the diaphragm around the aperture of the diaphragm. A sleeve is slidably mounted on the shaft and has an outturned collar or flange for engaging the opposite face of the diaphragm around the aperture thereof. A spring acts on this sleeve to urge the diaphragm into sealing engagement with the end face of the bushing. Leakage from the pump will be stopped in the chamber by this seal construction, since the diaphragm and bushing will not permit materials to leak along the shaft out of the end cap.

The seals of this invention, by having a spring metal diaphragm and a hard non-metallic bushing in slidable sealing engagement, will far outlast heretofore known seals embodying the use of metal parts. The heretofore known seals rapidly wear out due to heat and friction. Since the bushing used in the seal construction of this invention does not have cutting abrasive properties like metals, and especially non-ferrous metals, less friction is encountered and less heat developed.

A multi-piece tapered metal ferrule is disposed around the bushing in seals of this invention, and the ferrule pieces are urged together by a clamping arrangement disposed around the bushing to radially deform the same into tightly clamped position on the pump shaft.

It is preferred to have the bushing disposed between the end cap and the diaphragm so that the opposite face of the diaphragm will be exposed to pump pressure and this pump pressure will be effective in urging the diaphragm against the sealing face of the bushing. Thus when the seal construction is being utilized to prevent leakage from a high pressure pump, the pump pressure is effective to urge the diaphragm against the bushing with more force than is necessary for sealing against low pressure leakage. As a result, the friction pressure between the diaphragm and bushing may vary in accordance with the pressure being sealed so that high friction pressures are not encountered unless the pressure of the material being sealed requires such pressures, whereupon the material itself will produce the pressures.

It is, then, an object of this invention to provide a seal construction including a spring metal flexible diaphragm and a non-metal cooperating member in sliding face engagement with the diaphragm.

A further object of the invention is to provide a shaft seal wherein a non-metallic member is locked on a shaft and has an end face in sliding face engagement with a flexible diaphragm.

A still further object of the invention is to provide a pump seal wherein a multi-piece pump housing provides a seal chamber and has the pump shaft passing therethrough, including a flexible diaphragm clamped between the pieces of the pump housing and extending across said chamber in spaced relation from said shaft together with a non-metallic bushing clamped on the shaft and held in face engagement with the diaphragm.

A further object of the invention is to provide a split ferrule clamp construction for radially compressing a plastic composition bushing onto a shaft.

Other and further objects of the invention will be apparent to those skilled in the art from the following detailed description of the annexed sheet of drawings which, by way of preferred example only, illustrates one embodiments of the invention.

On the drawing:

Figure 1 is a vertical cross-sectional view, with parts in elevation, of a pump equipped with a seal construction of this invention.

Figure 2 is an exploded cross-sectional view of the elements of the seal construction of this invention.

Figure 3 is an end elevational view of the seal bushing of this invention.

Figure 4 is an end elevational view of the seal assembly of this invention.

As shown on the drawing:

In Figure 1 the reference numeral 10 designates generally a pump which can be of any suitable construction such as, for example, a gear pump, a rotary vane pump, or the like. The pump 10 includes a casing with a hollow neck portion 11 projecting from an end wall 12 having a bearing 13 therein and closed by an end cap or cover 14 having a bearing 15 therein. A pump shaft 16 is rotatably mounted in the bearings 13 and 15 and extends through a chamber 17 provided by the hollow neck 11 and the end cap 14.

The end cap 14 can carry a lubricant fitting 18. A lubricant-conveying duct 19 in the end cap 14 joins the fitting 18 with the bearing 15.

Bolts such as 20 connect the end cap 14 to the neck 11.

As shown, the end cap 14 has a pilot portion 21 seated in a countersunk recess 22 in the end of the hollow neck portion 11. A gasket 23 is provided in the recess 22 bottomed on a shoulder 24 at the end of the recess. This gasket 23 is preferably composed of material such as lead, copper or the like.

In accordance with this invention, a thin flexible metal disk 25 preferably composed of blue tempered spring steel is clamped around the periphery thereof between the pilot portion 21 of the end cap 14 and the gasket 23 in the counterbore 22. The bolts 20 will draw the end cap 14 so that the pilot portion 21 will be urged toward the shoulder 24 and tightly grip the periphery of the diaphragm 25 against the gasket 23 to seal the periphery of the diaphragm. The diaphragm 25 extends across the chamber 17 and has a central aperture 26 disposed around the shaft 16 in spaced relation therefrom.

A sleeve 27 is slidably mounted on the shaft 16 and has an outturned collar 28 of larger diameter than the aperture 26 in the diaphragm for engaging one face of the diaphragm, together with a pilot portion 29 for seating in the aperture 26.

A coil spring 30 is disposed around the shaft 16 and sleeve 27 and held under compression between the wall 12 of the housing and the collar 28 of the sleeve for urging the sleeve toward the diaphragm.

A non-metallic bushing 31 composed of hard wearable plastic composition is disposed on the shaft 16 between the diaphragm 25 and the cap 14 in the chamber 17. As best shown in Figure 2, this bushing 31 has a cylindrical bore 32 extending from one end thereof into an enlarged recess 33 at the other end thereof. The bore 32 is adapted to snugly receive the shaft 16, while the recess 33 is of larger diameter than the shaft.

An annular end face 34 of larger diameter than the aperture 26 of the diaphragm 25 is provided around the recess 33 of the bushing. The bushing has a reduced diameter portion 35 extending from a shoulder 36 to the end thereof. The bushing thus has a large end 37 containing the recess 33 and providing the shoulder 36 together with a reduced diameter portion 35 extending to the other end of the bushing from the shoulder 36.

An annular groove 38 is formed around the reduced portion 35 of the bushing.

A rigid metal retainer ring or washer 40 has cylindrical bores 41 and 42 therein with a shoulder 43 therebetween. The bore 42 is sufficiently large to receive the enlarged portion 37 of the bushing while the bore 41 is disposed over the reduced diameter portion 35 of the bushing. The shoulder 43 of the retainer 40 is adapted to be bottomed on the shoulder 36 of the bushing.

Screw tapped holes 44 are provided at spaced intervals around the marginal portion of the ring 40. Four such holes are usually provided.

A split or two-piece ferrule 45 has a conical or otherwise tapered external surface 46, a cylindrical bore 47 therethrough adapted to receive the reduced diameter portion 35 of the bushing 31 and an inwardly projecting flange 48 at one end of the bore 47 for seating in the groove 38 of the bushing.

The ferrule 45 can be composed of two or more pieces held in spaced relation from each other when seated around the reduced diameter portion 35 of the bushing 31 or it can be composed of a single split ring having a gap at the split ends thereof so that the member can be sprung to close the gap.

A rigid metal clamping member or washer 50 is provided with a conical or tapered bore 51 for receiving the ferrule 45. This clamping member 50 has untapped holes 52 around the periphery thereof for alignment with the holes 44. The holes 52 are countersunk as at 53 inwardly from the face of the ring toward which the tapered bore 51 converges.

Socket head screws 54 have shanks 55 adapted to project freely through the holes 52 of the clamp member 50 for threading into the tapped holes 44 of the retainer 40 together with socket heads 56 for seating in the counterbores 53 of the clamp member 50.

As shown in Figure 1, when the seal parts of Figure 2 are assembled in the chamber 17 and on the shaft 16, the spring 30 urges the collar 28 of the sleeve 27 against the diaphragm 25 around the aperture 26 of the diaphragm, while the pilot portion 29 of the sleeve projects through the aperture 26 of the diaphragm and into the recess 33 of the bushing 31, in spaced relation from the recess defining wall. The retainer 40 receives a portion of the large end 37 of the bushing in the recess 42 thereof, and the shoulder 43 of the retainer 40 is bottomed on the shoulder 36 of the bushing. The split or multipiece ferrule 45 is disposed around the bushing and has the flange 48 thereof seated in the groove 38 of the bushing. The ferrule 45 when seated on the bushing with its flange in the groove 38 abuts the retainer 40 to bottom the retainer on the shoulder 36 of the bushing. The retainer 40 is thus secured on the bushing against appreciable longitudinal movement relative thereto. The flange 48 and groove 38 also prevent the ferrule 45 from slipping axially on the bushing. The clamping member 50 receives, in the tapered bore thereof, the tapered external surface of the ferrule 45, and the headed screws 54 draw the clamping member 50 toward the secured retainer 40 for forcing the ferrule members radially inward on the bushing to clamp the bushing onto the shaft 16.

The entire assembly composed of bushing 31, retainer 40, ferrule pieces 45, clamp 50 and screws 54 can be placed on and removed from the shaft 16 as a unit by merely loosening the screws 54 to relieve the radial load on the bushing. This feature is highly important to facilitate installation and removal. Even after long usage in pumps handling solvents, oils and gasolines the bushing 31 used in this invention will not swell or stick to the shaft.

The spring-urged sleeve 27 holds the portion of the diaphragm 25 around the aperture 26 against the end face 34 of the bushing and material leaking from the pump 10, for example along the bearing 13, cannot pass beyond the diaphragm 25. Even though the diaphragm 25 is subjected to suction tending to deflect it away from the bushing end face, the spring urged sleeve is effective to maintain sealing contact between the diaphragm and bushing. The sleeve is loose on the shaft and remains stationary against the stationary diaphragm.

Pump pressure leaking into the chamber 17 between the diaphragm 25 and the end wall 12 of this chamber will aid the spring 30 in urging the diaphragm against the end face of the bushing, thereby maintaining a tighter face to face engagement of these parts capable of withstanding leakage of high pressure material.

The metal diaphragm 25, as indicated above, is preferably composed of blue tempered spring steel, while the bushing 31 is preferably composed of hard wearable, non-swelling, non-metallic material capable of being radially deformed to be clamped on a shaft, such as plastic compositions, laminates, compressed fiber and the like. A suitable bushing material is known to the trade as "Textolite." In the claims the term "plastic composition" is used to generically designate the bushing material.

Since the bushing material does not have abrasive cutting properties such as are inherent in metal parts, the rubbing surfaces on the end face of the plastic composition bushing and on the spring steel diaphragm will withstand great wear.

From the above descriptions it will be apparent that this invention now provides a seal construction of the sliding face to face engagement type wherein a non-metallic bushing is adapted to be tightly clamped onto a rotating shaft by means of a tapered ferrule assembly and wherein a sheet metal diaphragm is held in sliding face engagement with an end of the bushing. The split ferrule clamping assembly includes a multi-piece ferrule having an inturned flange adapted to seat on a groove on the bushing to hold the ferrule against axial movement on the bushing, a rigid retainer thrusting against the bushing held ferrule, and a clamping ring capable of being drawn toward the retainer to urge the ferrule pieces inwardly, thereby compressing the bushing against the shaft into tight frictional gripping relation therewith.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A shaft seal comprising a plastic composition bushing, means for contracting said bushing into tight gripping engagement around a shaft, said bushing having a recessed end face, a flexible metal diaphragm having an aperture adapted to freely receive said shaft and a face portion surrounding said aperture adapted to engage the end face of the bushing, and a sleeve slidable on said shaft having a collar for engaging the other face of the diaphragm and a pilot portion projecting through the diaphragm aperture into the recess of the end face of the bushing in spaced relation from the recess defining walls.

2. In a shaft seal, a radially deformable sealing bushing having an external shoulder and an annular groove therearound spaced axially from said shoulder, a retainer member on said bushing bottomed on said shoulder, a multi-piece ferrule abutting said retainer having an inwardly projecting flange seated in said groove and an external tapered surface, a clamping member having a tapered internal bore receiving said ferrule, and screw means for drawing the clamping member toward said retainer to move the ferrule parts radially inward for radially loading the bushing into tight gripping engagement with a shaft extending through the bushing, said bushing, retainer, multi-piece ferrule, clamping member and screws being removable from the shaft as a unit by loosening the screws to relieve the load on the bushing.

3. A seal construction for a pump having a casing with a hollow neck portion and an end cap on said hollow neck portion together with a pump shaft rotatably supported by the casing and end cap and passing through the chamber provided by the hollow neck portion, the improvements of a gasket between the hollow neck portion and the end cap, a metal diaphragm in said chamber clamped around the periphery thereof between the gasket and the end cap, said diaphragm having a central aperture freely receiving said shaft therethrough, a sleeve slidable on said shaft having a collar portion acting on one face of the diaphragm and a pilot portion projecting through the diaphragm aperture, a spring urging said sleeve collar against said diaphragm face, a non-metallic bushing clamped on said shaft having an end wall for sliding face engagement with the face of the diaphragm opposite that face engaged by the sleeve collar, and said bushing having a recess receiving said pilot portion of the sleeve freely therein.

4. In a shaft seal, a sealing bushing for mounting on a shaft, a retainer on the bushing, means holding the retainer against axial movement on the bushing, a ferrule on the bushing, a clamp ring around said ferrule, and means for drawing the clamp ring toward the retainer to move the ferrule radially inward for deforming the bushing tightly onto the shaft, said bushing, retainer, ferrule and clamp ring being removable as a unit from the shaft.

5. In combination with a housing and cover defining a chamber, a thin spring metal apertured diaphragm extending across said chamber and sealed around the periphery thereof between the housing and cover, a shaft in said chamber extending freely through the diaphragm aperture, a sleeve slidable on the shaft having a collar portion thrusting against one face of the diaphragm and a pilot portion projecting into the diaphragm aperture, a plastic composition bushing on said shaft having a recessed end face engaging the other face of the diaphragm and accommodating the pilot portion of the sleeve in the recess thereof, said bushing having a grooved reduced diameter portion projecting away from said recessed end face thereof and providing a shoulder, a multi-piece ferrule having a portion seated in said groove of the bushing and a peripheral portion converging away from the shoulder, a retainer on the bushing held between the shoulder and ferrule, a clamping member having a tapered aperture receiving the periphery of the ferrule, screws for drawing the clamping member toward the retainer to act on the ferrule for radially deforming the bushing into tight gripping relation with the shaft, and a coil spring on the shaft urging the sleeve collar against the diaphragm to maintain the diaphragm and recessed end face of the bushing in face-to-face sealing engagement.

6. A seal construction comprising a spring metal flexible apertured diaphragm adapted to be fixedly clamped and sealed around the periphery thereof, a plastic composition bushing capable of being radially deformed and having an end face for engaging a face of the diaphragm around the aperture, means urging the diaphragm against said end face of the bushing, a ferrule around said bushing, and longitudinally movable means wedgingly engaging said ferrule for radially loading said ferrule to inwardly deform the bushing.

7. A shaft seal comprising a non-metallic bushing having a radially deformable portion adapted to be clamped onto a shaft within a housing, longitudinally shiftable means on said bushing for radially loading said deformable portion, said bushing having an end sealing face, and a thin flexible metal diaphragm adapted to be clamped around the periphery thereof between housing parts, said diaphragm having an aperture therethrough adapted to freely embrace the shaft together with a face for engagement with said sealing end face of the bushing to provide therewith sealing faces in sliding face-to-face engagement.

8. A shaft seal comprising a spring metal diaphragm for freely embracing a shaft, a hard wearable plastic material bushing for snugly embracing the shaft and having a radially deformable portion, means urging the bushing and the diaphragm into sliding face-to-face relation, a retainer on the bushing, means holding said retainer against free longitudinal movement of the bushing, a longitudinally shiftable clamping member on the bushing, and means for drawing the clamping member toward the retainer to inwardly deform the bushing.

OSCAR G. ODELIUS.